United States Patent [19]

Lind

[11] Patent Number: 4,490,638
[45] Date of Patent: Dec. 25, 1984

[54] SALIENT POLE ROTOR WITH AMORTISSEUR WINDING

[75] Inventor: LeRoger J. Lind, Minneapolis, Minn.

[73] Assignee: McGraw-Edison Company, Rolling Meadows, Ill.

[21] Appl. No.: 521,033

[22] Filed: Aug. 8, 1983

[51] Int. Cl.³ .............................................. H02K 1/24
[52] U.S. Cl. .................................... 310/269; 310/211; 310/216; 310/217; 310/194
[58] Field of Search ............... 310/42, 43, 45, 183, 310/194, 211, 216, 261, 269, 290, 217, 218

[56] References Cited

U.S. PATENT DOCUMENTS

| | | | |
|---|---|---|---|
| 949,784 | 2/1910 | Tideman | 310/269 |
| 1,394,289 | 10/1921 | Duten | 310/269 |
| 2,445,986 | 7/1948 | Adamson | 310/43 UX |
| 2,876,371 | 3/1959 | Wesolowski | 310/217 |
| 3,012,162 | 12/1961 | Rediger | 310/217 X |
| 3,597,646 | 8/1971 | Lawrenson | 310/211 X |
| 3,829,720 | 8/1974 | Swake et al. | 310/217 X |
| 3,831,268 | 8/1974 | Boyd et al. | 310/216 X |
| 4,028,573 | 6/1977 | Terrone | 310/217 |
| 4,158,225 | 6/1979 | Hertz | 310/211 X |
| 4,182,966 | 1/1980 | Mishra et al. | 310/269 X |
| 4,271,368 | 6/1981 | Burns | 310/211 X |
| 4,358,698 | 11/1982 | Peterson | 310/269 X |

*Primary Examiner*—Mark O. Budd
*Attorney, Agent, or Firm*—John S. Paniaguas; James A. Gabala; Jon Carl Gealow

[57] ABSTRACT

A unique design and construction is presented for the rotor of a dynamoelectric machine. The rotor is comprised of two end plates, bar means for holding the end plates together, a stack of pole laminations, electrical conductors wrapped about the laminations and an insulator means. The end plate contains apertures about its periphery such that the rotor can be balanced about two axis perpendicular the rotor axis of rotation by inserting masses/weights into the apertures. The insulator means electrically insulates the electrical conductors from the ends of the stack laminations, the rotor end plates and the rotor shaft. The insulator means by its unique shape further acts as a guide to position electrical conductors about the laminations during pole winding. In one embodiment the insulator means acts as a thermal insulator protecting electrical conductors when the bar means are welded to the end plates.

15 Claims, 9 Drawing Figures

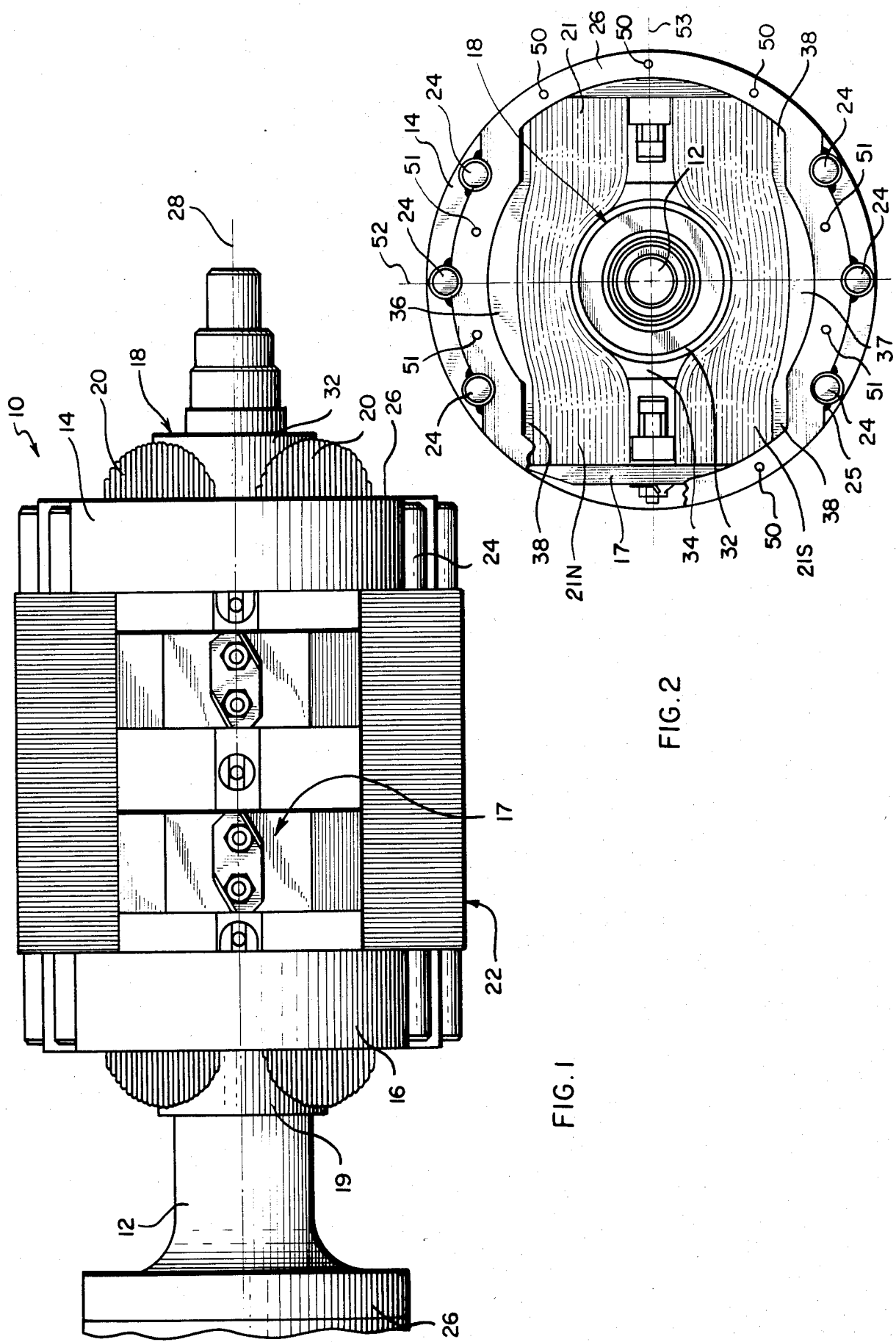

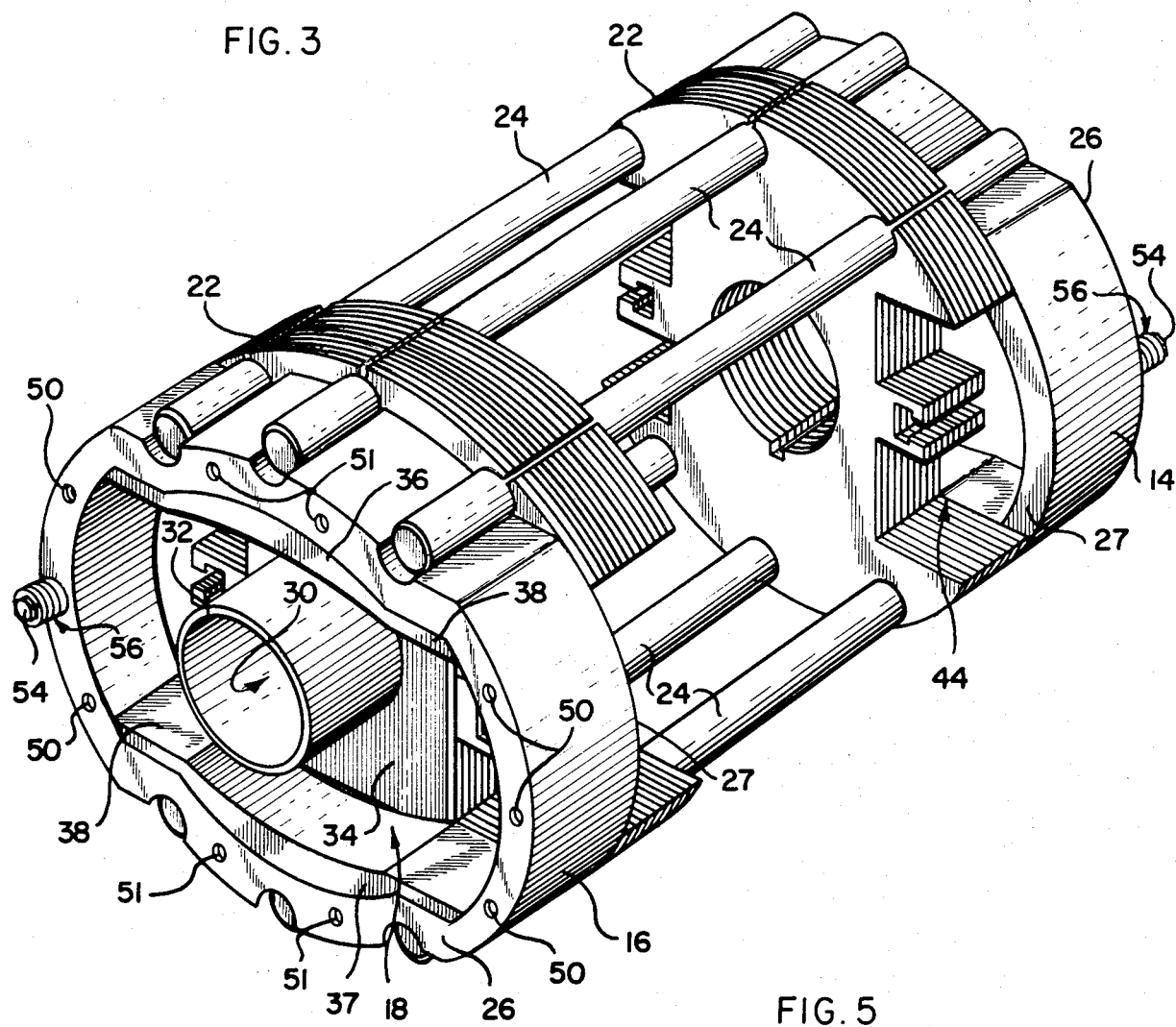
FIG. 3
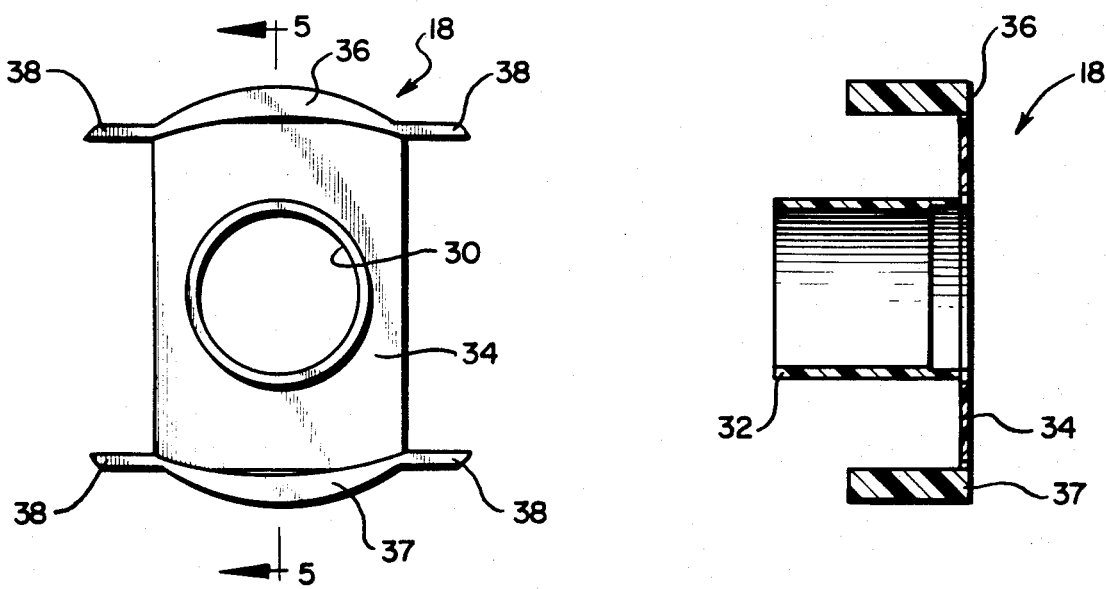
FIG. 4
FIG. 5

SALIENT POLE ROTOR WITH AMORTISSURE WINDING

TECHNICAL FIELD

This invention relates to electrical apparatus, in general, and more particularly, to an improved rotor for a dynamoelectric machine having a unique balancing feature.

BACKGROUND OF THE INVENTION

In electrical apparatus, such as salient pole dynamoelectric machines, it is necessary that the rotor, possibly weighing up to several hundred tons or more, be near perfectly balanced about its axis of rotation; viz, within a couple of ounce - inches. A typical rotor is illustrated in U.S. Pat. No. 4,358,968 to Peterson et al.

The balancing process begins with the manufacture and assembly of the rotor components. The rotor is forged within a very tight tolerance. Conductor windings, laminations and rotor bars are weighed to assure that all symmetrical components are virtually identical in weight. For example, one pole winding would be manufactured to weigh exactly as much as each of the other pole windings. However, with an apparatus as large as a dynamoelectric salient pole rotor, it is impossible to perfectly balance the rotor about its axis of rotation by precision manufacturing and assembly alone.

The object of rotor balancing is to prevent excessive vibrations at the rotor bearings and to allow smaller clearance between the rotating and stationary parts of the machine. Aerodynamically and electrically, it is ideal to minimize this distance (i.e., windage losses). However, from a safety standpoint, clearance between the stationary and rotating components (including smaller clearances caused by vibration) must be provided. Furthermore, the more perfectly balanced the rotor, the lower are the rotational losses. Therefore, since the requisite rotor balancing cannot be accomplished by manufacturing all subcomponents to a tight tolerance and assembling all subcomponents with precision, additional balancing techniques must be employed.

One technique of balancing the rotor is by affixing weights on the rotor periphery. In this manner, the assembled rotor can be both statically and dynamically balanced. Those skilled in the art know that rotor balancing involves the arrangement of weights in two planes. Preferably the balancing weights should be few and as small in size as possible, thus making residual imbalance as small as possible.

Although, rotor balancing must be kept in mind during construction of the rotor, it is often impossible to predict the preferred balancing locations. Therefore, the most useful rotor design is one that provides flexibility of rotor balancing locations and one that allows for the use of many combinations of relatively small balancing weights.

Salient pole machines are often designed without primary regard to the difficult problem of rotor balancing. They do allow for balancing in two planes; they do not allow for balancing about the quadratures axis of each plane, where the quadrature is the axis of symmetry between the midpoint of the field poles. This inability to balance the rotor in each plane about the direct and quadrature axes has necessitated the use of large balancing weights which cause greater rotational stresses.

Clearly, a salient pole rotor design which provides for the addition of many combinations of small balancing weights about the direct and quadrature axes, one which could be easily adapted to existing generator designs and one which is relatively inexpensive would be widely accepted by the industry and would go far toward achieving optimum rotor design.

SUMMARY OF THE INVENTION

In accordance with the present invention, a rotor for a salient pole dynamoelectric machine is disclosed comprising: a first rotor end plate; a second rotor end plate; means for connecting the end plates together in a cage-like structure; a plurality of pole laminations disposed between the end plates; and a plurality of electrical conductors wrapped about the laminations. In one embodiment an insulator means is carried by the end plates to insulate the electrical conductors and the rotor shaft ends. The end plate disclosed is especially designed to permit balancing about two axes perpendicular to each other, and both perpendicular to the rotational axis of the shaft, hereinafter called the direct axis and the quadrature axis. The direct axis is effectively the axis of symmetry of the field poles, and the quadrature axis is the axis of symmetry midway between the field poles. Thus, unlike conventional designs, this salient pole rotor may be balanced about the quadrature axis.

In one embodiment the rotor end plate is provided with a plurality of apertures which are located about the periphery of the plate and at two different distances from the axis of rotation. Thus, the rotor can be balanced about both the direct and quadrature axis by varying the size of the apertures or by inserting masses/weight in the apertures. Accordingly, noise, friction, and windage losses are easily reduced compared to previous designs.

In one two pole embodiment of the invention, the end plate has a general elliptical plane form. One advantage of the elliptical shaped end plate is that it provides the rotor with the greatest strength within the available crosssections surrounding the rotor shaft. A further advantage is that this construction permits the maximum number of turns to be placed on the field poles and permits the largest shaft diameter in conjunction with the largest number of field turns.

In one embodiment, the end plate includes an aluminum extrusion in the form of a ring carried by the insulator means. This arrangement has the advantage of high strength and more ductility than a single cast-aluminum part. It also puts the greatest weight at the periphery of the rotor.

The insulator means functions to electrically insulate the electrical conductors from the end of the stack of laminations, the rotor end plates, and the rotor shaft ends. Although in the preferred embodiment, the electrical conductors are insulated, the insulator means provides an added protection to prevent a rotor electrical ground condition. The insulator means, when configured like the rotor laminations, further acts as a guide to position electrical conductors when they are wrapped about the laminations. The insulator means further acts as a thermal insulator protecting electrical conductors in embodiments where the connecting means are in the form of metal rods welded to the end plates. In these embodiments, the insulator means is preferably constructed of a plastic material that will withstand high temperatures directly under the weld zones of the end plate. More importantly, a light-weight insulator means permits maximum advantage to be taken of the weight of the metal on the periphery of the end plates.

Numerous other advantages and features of the present invention will become readily apparent from the following description of the invention and its various embodiments, from the claims, and from the accompanying drawings.

BRIEF DESCRIPTION OF THE DRAWINGS

FIG. 1 is a side view of a rotor for a dynamoelectric machine that is the subject of the present invention.

FIG. 2 is an end view of the rotor shown in FIG. 1, as viewed from the right end.

FIG. 3 is a perspective view of the rotor shown in FIG. 1 with the pole windings, and a portion of the laminations removed to illustrate the manner of assembly.

FIG. 4 is a plane view of the insulator means portion of the invention.

FIG. 5 is a cross-sectional end view of the insulator means shown in FIG. 4 as viewed along line 5—5 of FIG. 4.

DETAIL DESCRIPTION OF THE INVENTION

Figure 6:
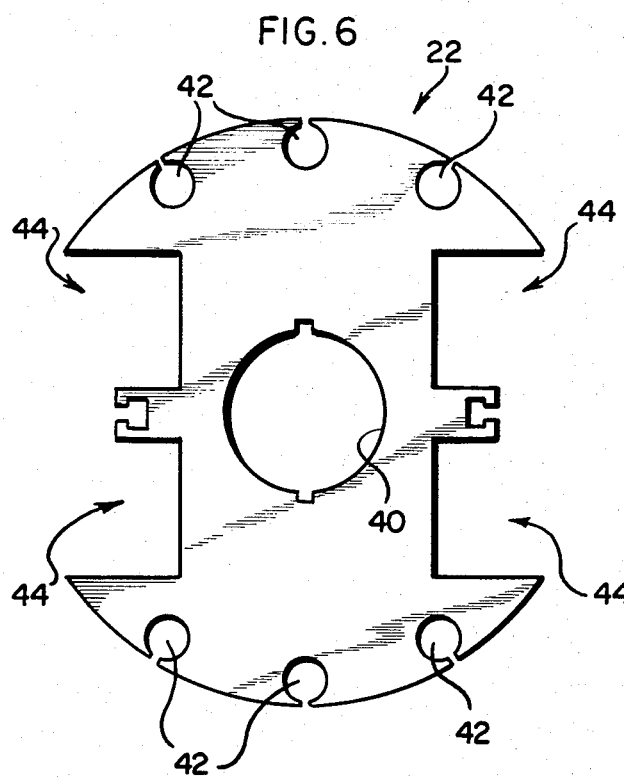
FIG. 6 is a plane view of a pole lamination.

While this invention is susceptible of embodiment in many different forms, there are shown in the drawings, which will herein be described in detail, several preferred embodiments of the invention. It should be understood however, that the present disclosure is to be considered as an exemplification of the principles of the invention and is not intended to limit the invention to any of the specific embodiments illustrated.

Referring now to the drawings, and to FIG. 1 in particular, there is shown a side view of the rotor 10 of a dynamoelectric salient pole machine having a shaft 12, a first end plate 14, a second end plate 16, a plurality of wound electrical conductors 20, a stack of laminations 22, connecting means 24 for connecting first end plate 14 and second end plate 16 to form a cage-like structure (See FIG. 3), and means 17 for holding the electrical conductors together against the force of rotation. The end plates 14 and 16 are carried by an insulator means 18 and 19 for insulating the electrical conductors 20 from the ends of the shaft. The rotor 10 is driven by a prime mover (not shown) through a coupling 26. The entire assembly is rotatably supported within a stator (also not shown for purpose of clarity).

FIG. 2 is an end view of the rotor. The electrical conductors 20 are wrapped about the laminations 22 to form a North Pole winding 21N and an oppositely disposed South Pole winding 21S. As such, the rotor 10 defines a two pole machine. In this embodiment, connecting means 24 is in the form of a plurality of metal bars connected to metal end plates to form a closed path called an amortisseur winding, disposed within the periphery of the laminations 22 and adjacent each pole. These bars are shown welded 25 to each end plate 14 and 16. Those skilled in the art will understand that the invention is equally applicable to other such fastening means including, but not limited to, brazing. It will be also understood that although FIGS. 1 through 9 depict a two pole machine, the invention is equally apply to multi-pole machines including four pole machines. It is also understood that additional pole windings are used in dynamoelectric machines where a lower synchronous speed is desired (i.e., the greater the number poles, the lower the speed).

Turning now to FIG. 3, the manner of assembly of the rotor 10 is illustrated. The first end plate 14 and the second end plate 16 define faces 26 and 27. The laminations 22 are stacked between the first end plate 14 and the second end plate 16 and are centered about the axis of rotation 28 (See FIG. 1) of the assembly 10. The insulator means 18 and 19 (see FIG. 1) are positioned between the laminations 22 and the associated end plate 14 and 16. In the preferred embodiment, each end plate is made from an electrical conducting material such as aluminum. The end plate can also be considered a composite structure consisting of an outer conducting portion and an inner insulating portion, thus eliminating the need for a separate insulator means 18.

Turning to FIGS. 4 and 5 one of the insulator means is illustrated. The insulator means 18 includes a tubular portion 32, a flat generally rectangular portion 34, two oppositely disposed arcuate sections 36 and 37, and a pair of leg-like sections 38 at the ends of each arcuate section. The tubular portion 32 defines an aperture 30 centered about the axis of rotation 28 to accept the rotor shaft 12 (See FIG. 1). The tubular-like structure 32 protrudes beyond the exterior faces 26 of the end plates 14 and 16. This serves to protect the electrical conductors 20 from contacting the rotor shaft 12 ends during wrapping about the laminations 22. The flat portion 34 of the insulator means 18 specifically prevents the electrical conductors 20 from contacting the ends of the stack of laminations 22. The arcuate sections 36 are restrained by the associated end plates 14 and 16. They also insulate the electrical conductors 20 from the end plates. The leg-like portions 38, in addition to insulating the electrical conductors 20 from the end plates 14 and 16, combine with the laminations 22 to form a core or mandrel for winding the electrical conductors to form the two pole windings 21N and 21S. Thus, during pole winding the leg-like portions 38 of the insulator means 18 function as a "guide" to position the electrical conductors 20 about the stack of laminations 22.

The insulator means 18 also provides secondary electrical insulation of the electrical conductors 20 from the rotor shaft 12, the conductive portions of the first end plate 14, the second end plate 16 and the laminations 22 to prevent a rotor electrical ground condition. The primary insulation for the electrical conductor 20 is, of course, the insulation applied to or otherwise encasing the electrical conductors 20.

The insulator means 18 also acts as a thermal insulator in an embodiment, such as that depicted in FIG. 2, where the connecting means 24 are bars welded 25 to the first end plate 14 and the second end plate 16. Here the connecting means 24 are welded 25 to the conductive portions of the first end plate 14 and the second end plate 16 after the electrical conductors 20 are wrapped around the laminations 22 and the insulator means 18. In one commercial embodiment the insulator means 18 is made from a high temperature polyetherimide resin based plastic, such as General Electric ULTEM 2300.

FIG. 6 is a plane view of one of the laminations 22. The laminations 22 are generally made of steel and welded in a stack. They are positioned between the first end plate 14 and the second end plate 16 and are generally centered about the axis of rotation 28. Each of the laminations 22 define a central rotor shaft aperture 40 to accept the rotor shaft 12, a plurality of peripheral apertures 42 for accepting the connecting means 24 (See FIG. 3) and four generally rectangular notches or windows 44, located about the interior periphery. The electrical conductors 20 are wrapped around the stack of laminations 22 in the pole lamination windows 44 to form pole windings 21, as shown in FIG. 2. Each winding, when energized, forms an electromagnetic means for inducing an electromagnetic field in the laminations 22. One difference between a two pole rotor and a four pole rotor design is that the latter would be provided with twice the number of pole lamination windows 44 and pole windings 21. The first end plate 14, the second end plate 16, and the insulator means 18 and 19 would also be designed to accommodate the additional pole windings and pole lamination windows.

Figure 7:
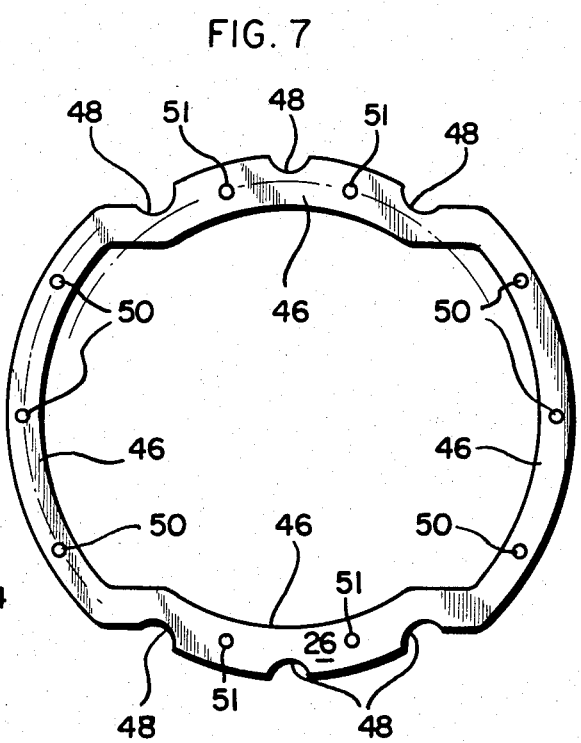
FIG. 7 is a plane view of one face of the rotor end plate.
Figure 8:
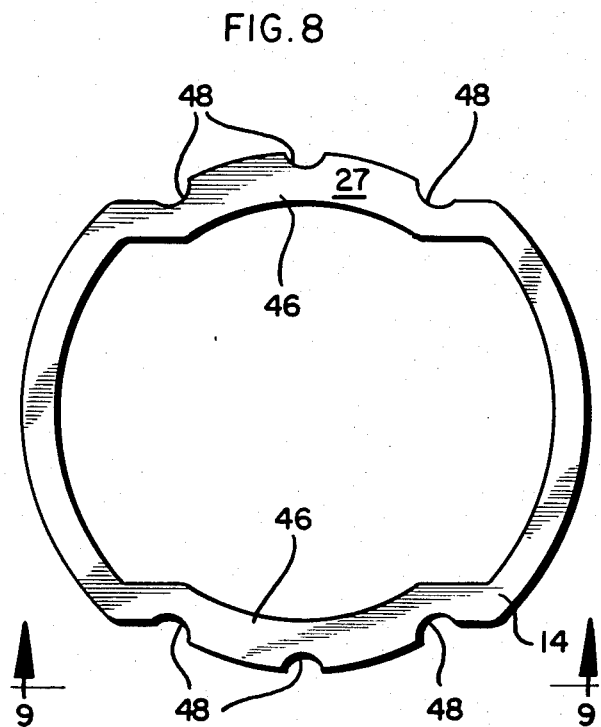
FIG. 8 is a plane view of the end plate face opposite to the one shown in FIG. 7.
Figure 9:
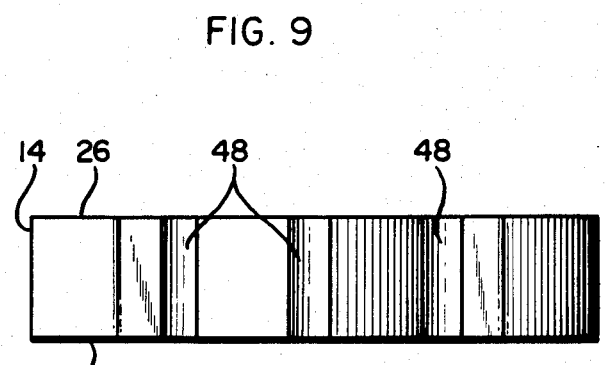
FIG. 9 is a top end view of the rotor end plate shown in FIG. 8 as viewed along the line 9—9 of FIG. 8.

FIGS. 7 and 8 are a plane view of the conductive portion of the first end plate 14. As previously indicated, this portion of the end plate 14 defines two faces 26 and 27. FIG. 7 illustrates the outer face 26, and FIG. 8 illustrates inner face 27. FIG. 9 is a top view. The conductive portion of first end plate 14 and the second end plate 16 are centered about the axis of rotation 28 of the shaft by the insulator means 18 and 19. In the embodiment shown, the conductive portion of each end plate 14 and 16 defines four arcuate sections 46 connected end to end to form a continuous generally ellipically shaped structure. Here cylindrical-like notches 48 are cut out about the outer circumference in two opposite arcuate sections 46 adjacent the poles to accept the metal bars forming the the connecting means 24.

In the preferred embodiment, the conductive portion of each end plate 14 and 16 defines a plurality of apertures 50 and 51 about the outer periphery. With this aperture arrangement the rotor assembly 10 may be balanced about both its direct axis 52 and the quadrature axis 53 (see FIG. 2). The embodiment shown in FIG. 3 shows the balancing apertures 50 and 51 as threaded holes with a threaded bolt 54 and a plurality of washers 56 secured to the apertures for balancing. Although this is the preferred embodiment, those skilled in the art would understand that instead of adding masses/weights to the apertures, the size of the apertures could be increased (i.e., removal of weight/mass opposite to where one might add mass/weight). They would also understand that other masses/weights other than a threaded bolt 54 and washers 56 could be used for balancing.

The first end plate 14 and the second end plate 16 shown in the drawings are for a two pole rotor and have a general elliptical plane form. It is not intended to limit the invention to any particular shape. However, it should be noted that in the case of a four pole generator design, the end plate would have a more generally circular plane form.

Now that the major components of the invention have been described in detail, the manner in which the components are assembled will be described. First, the laminations 22 are fastened together in a stack so as to define a central aperture 40 centered about the axis of rotation 28. The laminations 22 are then positioned between the two insulator means 18 and 19. The electrical conductors 20 are then wound around the insulator means 18 and 19 and the laminations 22 in the pole lamination windows 44, where the insulator means 18 and the laminations 22 form a core for wrapping the electrical conductors. The insulator means leg-like portions 38 also act as a guide to position electrical conductors 20 in the pole lamination windows 44. The conductive portions of the first end plate 14 and the second end plate 16 are then positioned such that the laminations 22 and the first insulator means 18 and the second insulator means 19 are between the conductive portions of the first end plate 14 and the second end plate 16 and are all centered about the axis of rotation 28 of the shaft 12. The conductive portions of the first end plate 14 and the second end plate 16 are then temporarily clamped firmly against the stack of laminations 22. The connecting means 24 is inserted through the lamination apertures 42 and welded at the end plate notches 48. The rotor shaft 12 is then inserted in the lamination shaft aperture 40. The complete rotor assembly 10 is then dipped in resin and baked. Subsequently the rotor assembly 10 is balanced by inserting masses/weights in the end plate apertures 50 and 51 or by varying the size of the end plate apertures.

From the foregoing it should be appreciated that the unique end plate design with end plate apertures 50 and 51 located about the periphery of end plates 14 and 16 allow the rotor assembly 10 to be balanced in both the quadrature axis 53 and direct axis 52. This geometry of balance weight locations also maximizes the mechanical advantage (e.g., moment arm) of each weight placed along the quadrature axis 53. Another similar advantage is that the balance weights may be placed in a plurality of combinations of radial distances to practically and analytically eliminate rotor unbalance. The ability to vary the amount of weight at a plurality of circumferential locations in each of the two end ring balance planes provides this unique advantage. There are many other inherent advantages of the invention:

1. Since each end plate 14, 16 is axially clamped firmly against the laminations 22 and fastened to the lamination aperture 42, the resulting axial force holds the end plates firmly against the laminations and provides mechanical support for the end ring to resist unsymmetrical radial forces caused during the process of balancing the rotor from the placement of masses/weights in the end plate apertures 50 and 51.

2. In one embodiment the end plate has a general elliptical plane form. This unique shape provides the greatest strength within the available cross section surrounding the rotor shaft 12. Thus, this construction also permits the maximum number of turns to be placed in the pole lamination windows 44 within the available space. Stated differently, this embodiment permits the use of the largest possible shaft diameter in conjunction with the maximum number of field turns for a given stator opening and in conjunction with a given lamination 22 diameter.

3. Noise and windage and friction losses are also reduced more easily. It is commonly understood in the art that these losses are caused in part by rotor imbalance and the geometric configuration of the end plates.

4. Also, in the general elliptical end plate embodiment, the electrical conductors and insulator means are restrained against radial movement when the rotor is spinning at high speed. Restraint is provided by the connecting means and unique design of the end plates. The strength of the end plate is not reduced by increasing its axial length as is the case with the conventional end plate.

5. It can be shown analytically that the end plate of this invention provides greater mechanical advantage for elimination of unbalance than does the conventional salient pole end plate construction. Hence, from a balancing point of view, it is more efficient.

Thus, it should be apparent that a unique rotor and method for constructing a generator rotor has been provided. The method and rotor itself are readily adaptable to conventional design practices and manufacturing techniques without requiring a complete redesign of the basic electrical apparatus or without extensive training of those persons who construct the device. Moreover, while the invention is described in conjunction with specific embodiments, it should be evident that there are many alternatives, modifications and variations which will be apparent to those skilled in the art in light of the foregoing description. For example, although the rotor shown in FIGS. 1 and 3 are for a two pole machine, the teachings of the invention may be applied to a four pole machine. In addition, a single forged end plate need not be used. Multiple sections or elements can be joined together. Accordingly, it is intended to cover all such alternatives, modifications and variations as set forth within the spirit and broad scope of the appended claims.

What is claimed is as follows:

1. A conductive rotor end plate assembly for use with a salient-pole dynamoelectric machine, comprising: a first conductive end plate and a second conductive end plate, each defining an axis of rotation; and conductive connecting means for connecting said first conductive end plate to said second conductive end plate such that both conductive end plates are generally centered about said axis of rotation and are generally parallel to each other, said first conductive end plate having at least one notch disposed about its outer periphery to receive said conductive connecting means so as to form an amortisseur winding and having a plurality of balancing apertures located about its plane of rotation at a plurality of radii from said axis of rotation and along two axes generally perpendicular to said axis of rotation.

2. The end plate as set forth in claim 1, wherein said end plate has a general elliptical plan form.

3. The end plate as set forth in claim 1, wherein at least one of said apertures are adapted to receive a weight to balance the distribution of mass along said axis of rotation.

4. The end plate as set forth in claim 1, wherein said first end plate includes an electrical insulator and an electrically conductive ring disposed along the periphery of said insulator.

5. A salient pole rotor for use with a dynamo electric machine, comprising:
    (a) a first conductive end ring with a second conductive end ring both having an axis of rotation, said first conductive end ring having a plurality of balancing apertures located about its periphery at a plurality of radii from the axis of rotation such that it can be balanced in two axis perpendicular to the axis of rotation by inserting one or more weights in said apertures;
    (b) at least one pole lamination disposed between said first conductive end ring and said second conductive end ring;
    (c) a plurality of electrical conductors which are partially supported by said first conductive end ring and said second conductive end ring wrapped about said pole lamination to form a pole winding; and
    (d) means for connecting said first end ring to said second end ring such that both end rings are generally centered about a common axis of rotation and are generally parallel to each other, said means being conductive.

6. A salient pole rotor as set forth in claim 5, further including insulator means, disposed between said pole lamination and each of said first and second end plates, for electrically and thermally insulating said electrical conductors from first and second end plates.

7. A salient pole rotor as in claim 6, wherein said insulator means includes a guide means for positioning the electrical conductors about said laminations while being wound to form said pole winding.

8. A conductive rotor assembly for a salient-pole dynamoelectric machine comprising:
    (a) a shaft defining an axis of rotation and two ends;
    (b) a plurality of laminations stacked together intermediate the ends of said shaft, each of said laminations defining an aperture adapted to receive said shaft and an outer generally circular edge;
    (c) electromagnetic means, carried by said laminations, for inducing an electromagnetic field within said laminations, said electromagnetic field defining at least one North magnetic pole and at least one South magnetic pole;
    (d) a first conductive end plate disposed at one end of said stack of laminations, said first conductive end plate defining a first aperture lying along a line connecting said North pole and said South pole and at a first distance from said axis of said shaft, and defining a second aperture disposed at a second distance from the axis of said shaft and generally at right angles to said line connecting said North pole and said South pole, said second distance being greater than said first distance;
    (e) a second conductive end plate disposed at the other end of said shaft; and
    (f) conductive connecting means, disposed along said edge of said laminations, for joining together said end plates so as to form an amortisseur winding.

9. The rotor set forth in claim 8, wherein said second end plates includes;
    (a) insulating means, carried by said shaft, for insulating said electromagnetic means from the ends of said shaft; and
    (b) a generally circular conducting ring carried by said insulating means and disposed adjacent said edge of said stack of laminations.

10. The rotor set forth in claim 9, wherein said conducting ring defines:
    a first aperture generally disposed adjacent said North pole;
    a third aperture disposed generally adjacent said South pole, said first and third aperture lying approximately equidistant from the axis of said shaft;
    a second aperture disposed intermediate said first and third apertures; and
    a fourth aperture disposed generally opposite said second aperture, said second and fourth apertures lying approximately equidistant from the axis of said shaft and at a distance from the axis of said shaft which is greater than the distance said first and third apertures are located from said shaft axis; and further including means, carried by at least one of said first, second, third, and fourth apertures, for balancing said rotor.

11. The rotor set forth in claim 8, wherein said connecting means includes a pair of conductors disposed along one of said North pole and South pole and electrically connected to said first end plate and said second end plate, whereby an amortisseur winding is formed.

12. The rotor set forth in claim 9, wherein said insulating means includes:
   a center section adapted to receive said shaft,
   two legs, each leg being joined to said center section and being disposed radially along the line connected said North pole and said South pole, and
   a carrier position, connected to the ends of said radial legs and adapted to receive said circular conducting ring.

13. The rotor set forth in claim 9, wherein said conducting ring is formed from four arcuate sections joined end to end to form a continuous generally ellipical shaped band, the minor diameter of which is generally parallel to the line joining said North pole and said South pole.

14. The rotor set forth in claim 8, wherein each of said laminations defines two oppositely disposed rectangular notches intermediate said North pole and said South pole.

15. The rotor set forth in claim 11, wherein each of said pole laminations defines a pair of apertures adapted to receive said pair of conductors.

* * * * *